United States Patent
Ryan et al.

(10) Patent No.: US 9,619,538 B2
(45) Date of Patent: Apr. 11, 2017

(54) TECHNIQUES FOR DATA INTEGRATION

(71) Applicants: Thomas Kevin Ryan, Valley Center, CA (US); Achal Patel, Vadodara (IN); Neelesh Bansode, Bangalore (IN); Arvind Kumar, Bangalore (IN); Anand Louis, Bangalore (IN)

(72) Inventors: Thomas Kevin Ryan, Valley Center, CA (US); Achal Patel, Vadodara (IN); Neelesh Bansode, Bangalore (IN); Arvind Kumar, Bangalore (IN); Anand Louis, Bangalore (IN)

(73) Assignee: Teradata US, Inc., Dayton, OH (US)

( * ) Notice: Subject to any disclaimer, the term of this patent is extended or adjusted under 35 U.S.C. 154(b) by 430 days.

(21) Appl. No.: 14/041,719

(22) Filed: Sep. 30, 2013

(65) Prior Publication Data
US 2014/0280218 A1   Sep. 18, 2014

Related U.S. Application Data

(60) Provisional application No. 61/788,712, filed on Mar. 15, 2013.

(51) Int. Cl.
G06F 17/30 (2006.01)

(52) U.S. Cl.
CPC .............................. *G06F 17/30569* (2013.01)

(58) Field of Classification Search
CPC ................................................ G06F 17/30569
USPC ....................................................... 707/748
See application file for complete search history.

(56) References Cited

U.S. PATENT DOCUMENTS

| | | | | |
|---|---|---|---|---|
| 4,138,719 A | * | 2/1979 | Swanstrom | B41J 5/30 358/1.18 |
| 7,289,964 B1 | * | 10/2007 | Bowman-Amuah | G06F 9/5038 705/1.1 |
| 7,484,096 B1 | * | 1/2009 | Garg | H04L 9/3247 382/109 |
| 7,519,605 B2 | * | 4/2009 | Vailaya | G06F 17/30864 |
| 8,719,267 B2 | * | 5/2014 | Chen | G06F 17/3071 707/737 |
| 8,972,337 B1 | * | 3/2015 | Gupta | G06F 17/30563 707/602 |
| 2003/0233321 A1 | * | 12/2003 | Scolini | G06Q 20/02 705/40 |
| 2004/0083199 A1 | * | 4/2004 | Govindugari | G06F 17/30303 |
| 2005/0055369 A1 | * | 3/2005 | Gorelik | G06F 17/30292 |
| 2005/0223109 A1 | * | 10/2005 | Mamou | G06Q 10/10 709/232 |
| 2005/0228808 A1 | * | 10/2005 | Mamou | G06F 17/30563 |
| 2005/0234969 A1 | * | 10/2005 | Mamou | G06Q 10/10 |
| 2006/0055956 A1 | * | 3/2006 | Takahashi | G06F 3/1211 358/1.13 |
| 2007/0088715 A1 | * | 4/2007 | Slackman | G06Q 10/10 |
| 2008/0027899 A1 | * | 1/2008 | Khunteta | G06F 17/3092 |
| 2008/0046474 A1 | * | 2/2008 | Sismanis | G06F 17/30306 |

(Continued)

*Primary Examiner* — Noosha Arjomandi
(74) *Attorney, Agent, or Firm* — Schwegman, Lundberg & Woessner, P.A.

(57) ABSTRACT

Techniques for data integration are provided. Source attributes for source data are interactively mapped to target attributes for target data. Rules define how records from the source data are merged, selected, and for duplication detection. The mappings and rules are recorded as a profile for the source data and processed against the source data to transform the source attributes to the target attributes.

12 Claims, 3 Drawing Sheets

(56) References Cited

U.S. PATENT DOCUMENTS

| | | | |
|---|---|---|---|
| 2008/0243772 A1* | 10/2008 | Fuxman | G06F 17/2264 |
| 2008/0320012 A1* | 12/2008 | Loving | G06F 17/30297 |
| 2009/0012983 A1* | 1/2009 | Senneville | G06F 17/30566 |
| 2009/0077114 A1 | 3/2009 | Zachariah | |
| 2009/0125796 A1* | 5/2009 | Day | G06F 9/4443 |
| | | | 715/219 |
| 2009/0193046 A1* | 7/2009 | Desai | G06F 17/30315 |
| 2009/0319471 A1 | 12/2009 | Gooder | |
| 2009/0319494 A1 | 12/2009 | Gooder | |
| 2010/0057673 A1* | 3/2010 | Savov | G06F 17/30569 |
| | | | 707/E17.002 |
| 2011/0093453 A1* | 4/2011 | Frayman | G06Q 50/18 |
| | | | 707/723 |
| 2011/0161352 A1* | 6/2011 | de Castro Alves | G06F 17/30516 |
| | | | 707/769 |
| 2012/0060216 A1* | 3/2012 | Chaudhri | G06F 19/322 |
| | | | 726/21 |
| 2012/0158655 A1* | 6/2012 | Dove | G06F 17/30587 |
| | | | 707/627 |
| 2012/0158678 A1* | 6/2012 | McGraw | G06F 17/30303 |
| | | | 707/694 |
| 2012/0221509 A1 | 8/2012 | Gao et al. | |
| 2013/0103705 A1* | 4/2013 | Thomas | G06F 17/30294 |
| | | | 707/756 |
| 2013/0124523 A1* | 5/2013 | Rogers | G06F 19/32 |
| | | | 707/737 |
| 2013/0254238 A1* | 9/2013 | Yan | G06F 17/30943 |
| | | | 707/793 |
| 2014/0222752 A1* | 8/2014 | Isman | G06F 17/30867 |
| | | | 707/603 |

\* cited by examiner

TECHNIQUES FOR DATA INTEGRATION

RELATED APPLICATIONS

The present application claims priority to, and is a non-provisional application of Provisional Application No. 61/788,712 entitled: "Techniques for Scalable Database Integration and Processing in a Database Environment," filed on Mar. 15, 2013; the disclosure of which is hereby incorporated by reference in its entirety herein and below.

BACKGROUND

After over two-decades of electronic data automation and the improved ability for capturing data from a variety of communication channels and media, even small enterprises find that the enterprise is processing terabytes of data with regularity. Moreover, mining, analysis, and processing of that data have become extremely complex.

Updating, mining, analyzing, reporting, and accessing the enterprise information can still become problematic because of the sheer volume of this information and because often the information is dispersed over a variety of different file systems, databases, and applications. In fact, the data and processing can be geographically dispersed over the entire globe. When processing against the data, communication may need to reach each node or communication may entail select nodes that are dispersed over the network.

Collecting, indexing, and managing data from a variety of sources and a variety of formats is challenging for any enterprise because data fields in one source may be different or may be associated with one field in another source. To deal with this, enterprises often spend a lot of time and resources to manually analyze the sources of data and to then convert those sources into a normalized format.

Even when the above work is done by an enterprise, the data managed may still not be associated with comprehensive records that avoid duplication. That is, duplication can affect the accuracy of the data and results associated with mining the data. Some enterprises may employ additional resources to ensure that data duplication is detected and corrected. These resources may work full time cleaning data received and processed by an enterprise on a daily basis.

SUMMARY

In various embodiments, techniques for data integration are presented. According to an embodiment, a method for data integration is provided.

Specifically, source data is identified and source data attributes present in the source data are mapped to target data attributes in target data. Finally, a profile is created for the source data that defines actions of the mapping.

DETAILED DESCRIPTION

Figure 1:
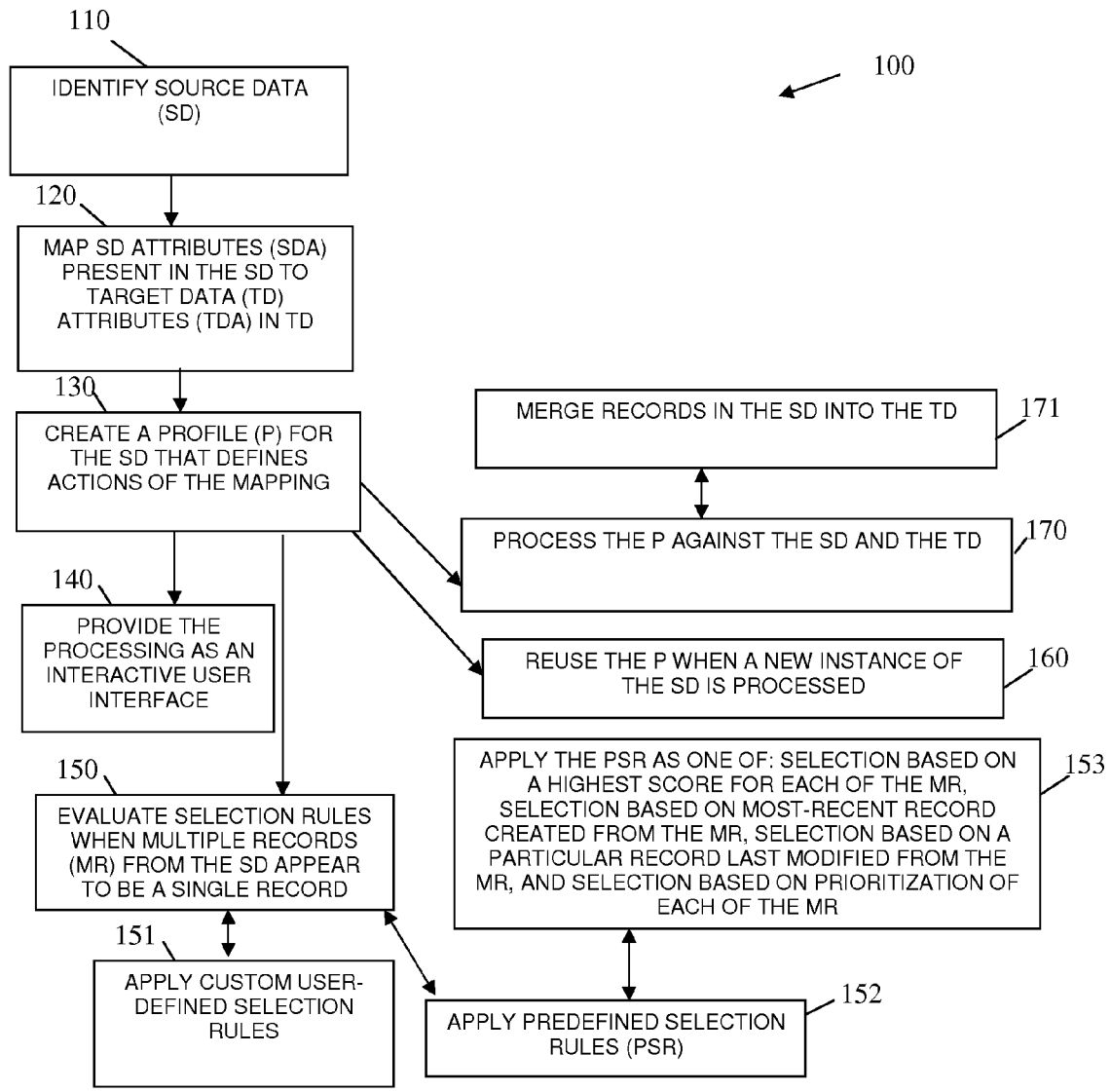
FIG. 1 is a diagram of a method for data integration, according to an example embodiment.

FIG. 1 is a diagram of a method 100 for data integration, according to an example embodiment. The method 100 (hereinafter "data mapper") is implemented as executable instructions that are programmed and reside within memory and/or non-transitory computer-readable storage media for execution on one or more processing nodes (processor(s)) of a network; the network wired, wireless, and/or a combination of wired and wireless.

Initially, it is noted that specific embodiments and sample implementations for various aspects of the invention are provided in detail in the provisional filing (Provisional Application No. 61/788,712), which is incorporated by reference in its entirety herein.

At 110, the data mapper identifies source data. In an embodiment, the source data is identified by a user accessing an interface, such as the interface discussed below and with reference to the FIGS. 2 and 3.

At 120, the data mapper maps source data attributes present in the source data to target data attributes in target data. Again, the target data can be selected by the user via an interface as well, such as an interactive interface. It is noted that in some cases, an automated service can be used to select both the source data and the target data.

The attributes and/or fields associated with the source data and the target data can be identified based on schemas or delimiters in the native data.

At 130, the data mapper creates a profile for the source data that defines actions of the mapping. The profile can be interpreted and used to drive execution that transforms the source data attributes into the target data attributes. In an embodiment, the profile is an executable script.

According to an embodiment, at 140, the data mapper and its processing (110-130) are provided as an interactive user interface (also discussed below with reference to the FIGS. 2 and 3).

In another case, at 150, the data mapper evaluates selection rules when multiple records from the source data appear to be a single record. That is, the groupings of data within the source data appear to be the same or similar.

Continuing with the embodiment of 150 and at 151, the data mapper applies custom user-defined selection rules. Again, the interface discussed above and below can be used to permit the user to interactively custom define the selection rules.

In another case of 150 and at 152, the data mapper applies predefined selection rules. That is, based on the type of source data, type of profile, and/or type of target data a predefined set of selection rules can be used.

For example, at 153, the data mapper applies the predefined selection rules as one of: selection based on a highest score for each of the multiple records, selection based on a most-recent record created from the multiple records, selection based on a particular record last modified from the multiple records, and selection based on prioritization of each of the multiple records.

In an embodiment, at 160, the data mapper reuses the profile when a new instance of the source data is processed. In other words, once the profile is established the entire source data or new instance of the source data can be automatically processed via the profile.

According to an embodiment, at 170, the data mapper processes the profile against the source data and the target data.

Continuing with the embodiment of 170 and at 171, the data mapper merges records in the source data into the target data.

In an embodiment, there is a cross-reference lineage between the source data and the target data within separate storage, such as database storage.

Figure 2:
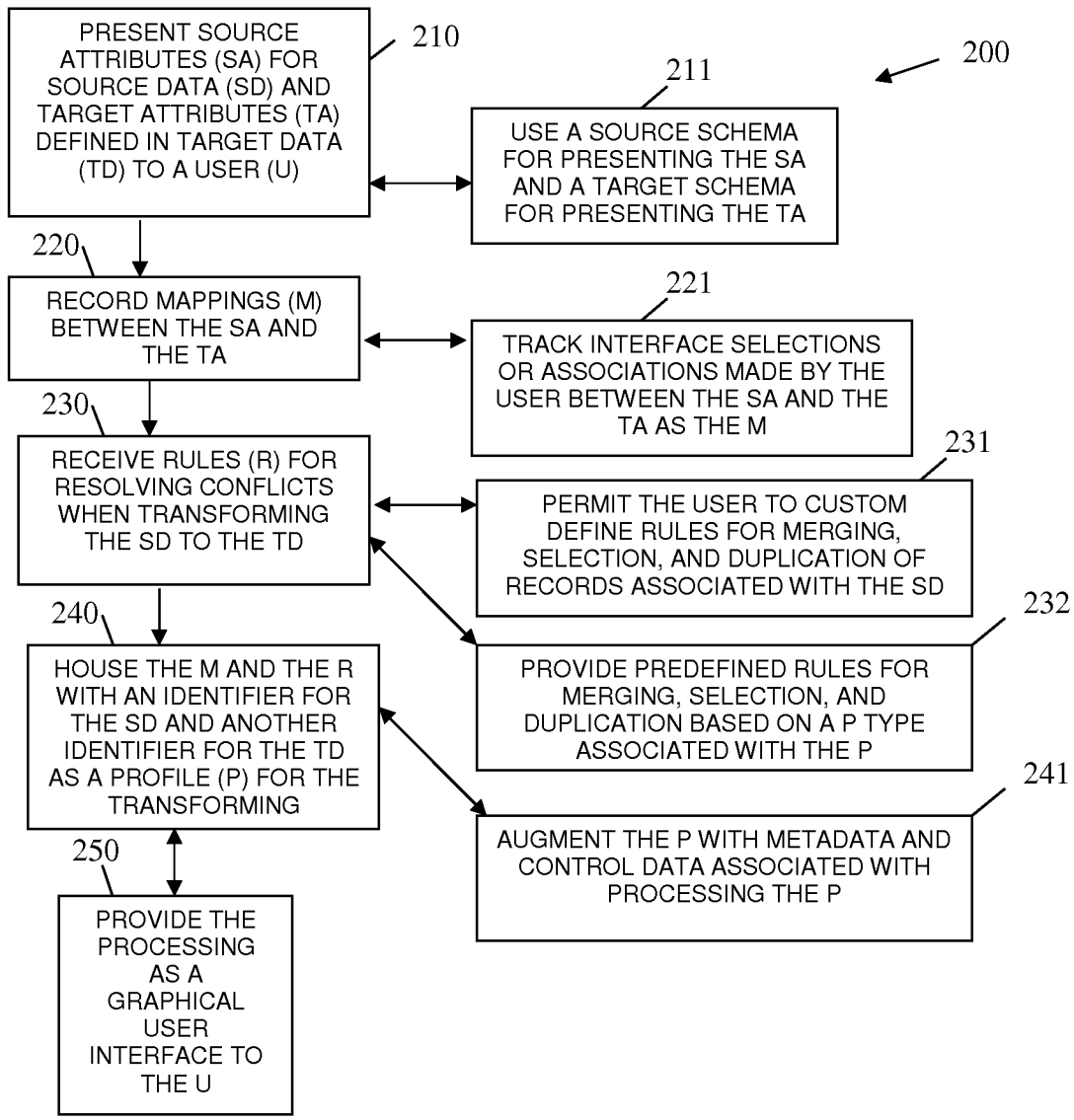
FIG. 2 is a diagram of a method for data integration, according to an example embodiment.

FIG. 2 is a diagram of a method 200 for data integration, according to an example embodiment. The method 200 (hereinafter "data integration interface manager") is implemented as executable instructions within memory and/or non-transitory computer-readable storage media that execute on one or more processors (nodes), the processors specifically configured to data integration interface manager. The data integration interface manager is also operational over a network; the network is wired, wireless, or a combination of wired and wireless.

The data integration interface manager presents a processing perspective from an interface (manual and controlled by a user and/or automated application that operates autonomously from any user) that utilizes the data mapper presented above with respect to the FIG. 1.

At 210, the data integration interface manager presents source attributes for source data and target attributes defined in target data to a user.

In an embodiment, at 211, the data integration interface manager uses a source schema for presenting the source attributes and a target schema for presenting the target attributes.

At 220, the data integration interface manager records mappings between the source attributes and the target attributes.

According to an embodiment, at 221, the data integration interface manager tracks interface selections or associations made by the user between the source attributes and the target attributes as the mappings.

At 230, the data integration interface manager receives rules for resolving conflicts when transforming the source data to the target data.

In an embodiment, at 231, the data integration interface manager permits the user to custom define rules for merging, selection, and duplication of records associated with the source data.

In another case, at 232, the data integration interface manager provides predefined rules for merging, selection, and duplication based on a profile type associated with the profile.

At 240, the data integration interface manager houses the mappings and the rules with an identifier for the source data and another identifier for the target data as a profile for the transforming.

According to an embodiment, at 241, the data integration interface manager augments the profile with metadata and control data associated with the processing of the profile.

In an embodiment, at 250, the data integration interface manager provides the processing as a graphical user interface to the user.

Figure 3:
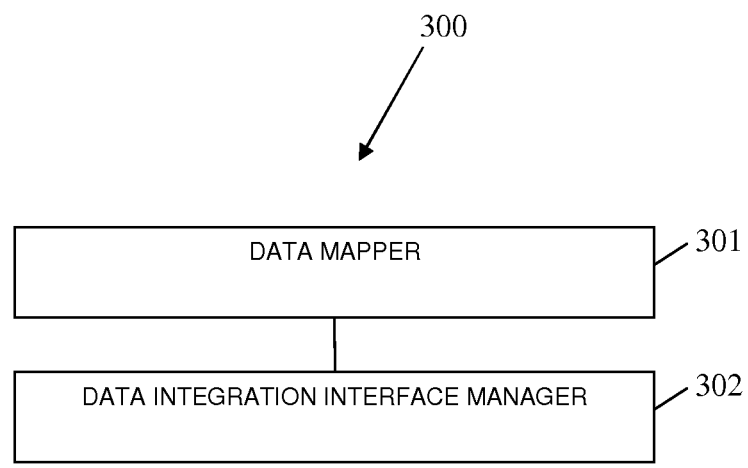
FIG. 3 is a diagram of a data integration system, according to an example embodiment.

FIG. 3 is a diagram of a data integration system 300, according to an example embodiment. The components of the data integration system 300 are implemented as executable instructions that are programmed and reside within memory and/or non-transitory computer-readable storage medium that execute on one or more processing nodes (processors) of a network. The network is wired, wireless, or a combination of wired and wireless.

The data integration system 300 implements, inter alia, the methods 100 and 200 of the FIGS. 1 and 2.

The data integration system 300 includes a data mapper 301 and a data integration interface manager 302.

The data integration system 300 includes a non-transitory computer-readable storage medium having executable instructions for the data mapper 301 that executes on one or more processors of the network. Example processing associated with the data mapper 301 was presented above with respect to the FIG. 1 and in some instances the FIG. 2.

The data mapper 301 is configured to create a mapping between source attributes for source data and target attributes for target data by monitoring actions of a user accessing an interface presented by the data integration interface manager 302.

The data integration system 300 includes a non-transitory computer-readable storage medium having executable instructions for the data integration interface manager 301 that executes on one or more processors of the network. Example processing associated with the data integration interface manager 301 was presented above with respect to the FIG. 2.

The data integration interface manager 302 is configured to create and to record a profile for mappings that when processed transforms the source attributes to the target attributes.

According to an embodiment, the data integration interface manager 302 is also configured to associate merge rules, duplication rules, and selection rules for records when processing the profile.

Continuing with the embodiment above, the data integration interface manager 302 is configured to receive custom rules for some of the merge rules, some of the duplication rules, and/or for some of the selection rules.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by a processor, the processor configured to execute the method, comprising:

identifying, by the processor, source data;

mapping, by the processor, source data attributes present in the source data to target data attributes in target data;

creating, by the processor, a profile for the source data that defines actions of the mapping, said profile comprising an executable script that transforms the source data attributes into the target data attributes;

processing, via the processor, the profile against the source and target data; and evaluating, via the processor, selection rules when multiple records from the source data appear to be a single record, wherein evaluating further includes applying at least one of the selection rules based on a highest score for each of the multiple records.

2. The method of claim 1 further comprising, providing, via the processor, the method as an interactive user interface.

3. The method of claim 1 further comprising, reusing, via the processor, the profile when a new instance of the source data is processed.

4. The method of claim 1 further comprising, merging, via the processor, records in the source data into the target data.

5. A method implemented and programmed within a non-transitory computer-readable storage medium and processed by a processor, the processor configured to execute the method, comprising:

presenting, via the processor, source attributes for source data and target attributes defined in target data to a user;

recording, via the processor, mappings between the source data attributes and the target data attributes;

receiving, via the processor, rules for resolving conflicts when transforming the source data to the target data; wherein receiving further includes applying at least one or the rules when multiple records from the source data appear as a single record based on a highest score for each of the multiple records;

housing, via the processor, the mappings and the rules with an identifier for the source data and another identifier for the target data as a profile for the transforming, said profile comprising an executable script that transforms the source data attributes into the target data attributes;

wherein receiving further includes providing predefined rules for merging, selection, and duplication based on a profile type associated with the profile; and processing, via the processor, the profile against the source and target data.

6. The method of claim 5, wherein presenting further includes using a source schema for presenting the source attributes and target schema for presenting the target attributes.

7. The method of claim 5, wherein recording further includes tracking interface selections or associations made by the user between the source attributes and the target attributes as the mappings.

8. The method of claim 5, wherein receiving further includes permitting the user to custom define rules for merging, selection, and duplication of records associated with the source data.

9. The method of claim 5, wherein housing further includes augmenting the profile with metadata and control data associated with processing the profile.

10. The method of claim 5 further comprising, providing, via the processor, the method as a graphical user interface to the user.

11. A system, comprising:

a non-transitory computer-readable storage medium having instructions for a data mapper that execute on one or more processors of a network; and the non transitory computer-readable storage media having instructions for a data integration interface manager that executes on the one or more processors of the network;

wherein the data mapper is configured to create a mapping between source attributes for source data and target attributes for target data by monitoring actions of a user accessing an interface presented by the data integration interface manager, and the data integration interface manager further configured to create and to record a profile for mappings that when processed transforms the source attributes to the target attributes, said profile comprising an executable script that transforms the source data attributes into the target data attributes, and wherein the data mapper is further configured to apply at least one or the conflict rule when multiple records from the source data appear as a single record based on a highest score for each of the multiple records; and wherein the data integration interface manager is configured to associate merge rules, duplication rules, and selection rules for records when processing the profile.

12. The system of claim 11, wherein the data integration interface manager is configured to receive custom rules for some of the merge rules, some of the duplication rules, and/or for some of the selection rules.

* * * * *